US011875037B2

(12) United States Patent
Bentley et al.

(10) Patent No.: US 11,875,037 B2
(45) Date of Patent: Jan. 16, 2024

(54) REQUEST-BASED CONTENT SERVICES REPLICATION

(71) Applicant: Viewpointe Archive Services, LLC, Charlotte, NC (US)

(72) Inventors: Jeffrey Mark Bentley, Troutman, NC (US); Robert Brian McCarthy, Denville, NJ (US); Richard Wayne Luchak, Spring, TX (US)

(73) Assignee: Viewpointe Archive Services, LLC, Charlotte, NC (US)

( * ) Notice: Subject to any disclaimer, the term of this patent is extended or adjusted under 35 U.S.C. 154(b) by 202 days.

(21) Appl. No.: 16/918,315

(22) Filed: Jul. 1, 2020

(65) Prior Publication Data

US 2022/0004322 A1 Jan. 6, 2022

(51) Int. Cl.
*G06F 16/00* (2019.01)
*G06F 3/06* (2006.01)
*G06F 9/54* (2006.01)
*G06F 16/27* (2019.01)

(52) U.S. Cl.
CPC ............ *G06F 3/0617* (2013.01); *G06F 3/065* (2013.01); *G06F 3/067* (2013.01); *G06F 3/0653* (2013.01); *G06F 3/0659* (2013.01); *G06F 3/0683* (2013.01); *G06F 9/546* (2013.01); *G06F 16/27* (2019.01)

(58) Field of Classification Search
CPC ....................................................... G06F 16/27
See application file for complete search history.

(56) References Cited

U.S. PATENT DOCUMENTS

| 7,979,352 | B2 | 7/2011 | Mcmonagle et al. | |
|---|---|---|---|---|
| 8,296,236 | B2 | 10/2012 | Mcmonagle et al. | |
| 11,095,534 | B1* | 8/2021 | Dunsmore | H04L 41/0286 |
| 2014/0379838 | A1* | 12/2014 | Gasser | H04L 67/2842 |
| | | | | 709/213 |
| 2020/0192693 | A1* | 6/2020 | Kawase | G06F 9/45558 |
| 2021/0042108 | A1* | 2/2021 | Suarez | G06F 8/71 |
| 2021/0382908 | A1* | 12/2021 | Mupparapu | G06F 16/22 |

OTHER PUBLICATIONS

PCT Application No. PCT/US2021/038893, International Search Report and Written Opinion, dated Oct. 13, 2021, 11 pages.
Shoshani et al., "RRS: Replica Registration Service for Data Grids", Data Management In Grids Lecture Notes In Computer Science, Jan. 1, 2005, pp. 100-112.

* cited by examiner

*Primary Examiner* — Khanh B Pham
(74) *Attorney, Agent, or Firm* — Kilpatrick Townsend & Stockton LLP (57) ABSTRACT

Aspects and features of this disclosure provide a high-availability storage platform employing multiple redundant sites. Replication to multiple sites can begin upon receiving content and can be completed quickly, in part through the use of a small and efficient file that can be sent to storage sites. The file enables each storage site to efficiently build appropriate entries in a reference registry for storing and indexing the content. In some examples, a registration request including the content is received and the content is stored in an instance of the centralized storage system at an initial storage site. The aforementioned file is transmitted to additional storage sites to cause the content to be stored in additional instances of the centralized storage system. The file can also be accessed at the additional storage sites to update instances of the reference registry.

17 Claims, 7 Drawing Sheets

```
{
    "registryInfo": {
        "type": "CreateRegistryEntry",
        "botName": "20200515022713050",
        "registryId":
"QS1lOTAyYzg0MGIyNjg0OWZhYmY4ODM0Y2NkZjQxYmNiYi0yMDIwMDUxNTAyMj
cxMzA1MQ==",
        "registryIdSignature":
"SyOBtAUWnvstCoYfNMxlSC7KSEAkR4JO1CKqUgcryqlb5VO39e0zlf58CRvZ1T
s2FO/e4SotE0eGLuCaO4/
mpXm96Mi7nX2YLsiQLTaxq9JxHfdbnARS6z1113NEn2eQY333URks/
5mFc3bmN7RSu+hFzILk8+H5k5FCE15yUWc=",
        "status": "5",
        "usage": "PROD",
        "ipAddress": "10.109.199.219",
        "errorNumber": "0",
        "errorMessage": "",
        "internalErrorMessage": "",
        "warnings": "",
        "repositoryFolder": "/opt/apache-tomcat-9.0.19/
storage/20201002/02/27/13",
        "samlUserId": "security@bobsbank.com",
        "expirationDate": "20201002022713069",
```

© 2020 Viewpointe Archive Services, LLC

FIG. 5A

```
"minAccessDays": "120",
        "originatingONPid": "111111RT",
        "originatingAccessDate": "20200927022713069",
        "originatingEntityId": "CREDITOR1",
        "originatingAdditionalDays": "5",
        "originatingAdditionalONPDays": "10",
        "recipientInfo": [{
            "onpId": "303030RT",
            "entityId": "DEBTOR1",
            "accessDate": "20201002022713069",
            "additionalDays": "12",
            "additionalONPDays": "8"
        }],
        "expectedCount": "1",
        "created": "20200515022713091",
        "received": "20200515022713044",
        "registered": "20200515022713088"
    },
    "contentInfo": {
        "expectedCount": "1",
        "contentObjects": [{
```

© 2020 Viewpointe Archive Services, LLC

FIG. 5B

```
"location": "centralDataRepository",

"type": "PDF",

"label": "label1",

"versions": [{

"received": "20200515022713047",

"version": "1",

"size": "4",

"fileName":
"QS1lOTAyYzg0MGIyNjg0OWZhYmY4ODM0Y2NkZjQxYmNiYi0yMDIwMDUxNTAyM
jcxMzA1MQ==.1.1", "url": "", "webServicePayload": "", "status": "Available"

}]

}]

}
```

© 2020 Viewpointe Archive Services, LLC

REQUEST-BASED CONTENT SERVICES REPLICATION

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure generally relates to data processing techniques to replicate data in order to maintain redundant copies of the data. More specifically, but not by way of limitation, this disclosure pertains to performing data replication in part by efficiently sharing reference information for the data across multiple locations to improve performance.

BACKGROUND

Many businesses have established processing relationships under a set of mutually agreed to methods, processes and time limitations that are directly related to the secure exchange of important electronic documents. For example, businesses need to use computing resources to exchange digital remittance documents evidencing monetary transactions, using agreed formats, some of which are set out in legal standards. For such users, storage systems must maintain a high degree of reliability, since data loss can be catastrophic and customers demand speedy processing. Data replication is often used to improve reliability by storing redundant copies of data at multiple locations. Due to the importance of data replication in preventing data loss, extensive computing resources are provisioned for data replication tasks.

SUMMARY

In one example, a system includes a processing device and at least one memory device further including instructions that are executable by the processing device for causing the processing device to perform operations. The operations include receiving, at a first storage site, a registration request including content to be registered in a storage system. The operations also include storing the content in a first instance of the storage system at the first storage site, and storing a descriptive entry in a first instance of a reference registry at the first storage site. The descriptive entry corresponds to the content. The operations also include transmitting a registry replicant to a second storage site based on the descriptive entry, and causing the content to be replicated in a second instance of the storage system at the second storage site based on the registry replicant.

In another example, a method includes receiving, by a processing device at a first storage site among multiple storage sites, a registration request including content to be registered in a storage system. The method further includes storing, by the processing device, the content in a first instance of the storage system at the first storage site and storing, by the processing device, a descriptive entry in a first instance of a reference registry at the first storage site. The descriptive entry corresponds to the content. The method further includes transmitting, by the processing device, a registry replicant to the second storage site based on the descriptive entry, and causing the content to be replicated in a second instance of the storage system at the second storage site based on the registry replicant.

In another example, a non-transitory computer-readable medium includes computer program instructions executable by a processing device to cause the processing device to perform operations. The operations include receiving, at a first storage site, a registration request including content to be registered in a storage system, storing the content in a first instance of the storage system at the first storage site, and storing a descriptive entry in a first instance of a reference registry at the first storage site. The descriptive entry corresponds to the content. The operations further include transmitting a registry replicant to a second storage site based on the descriptive entry, and causing the content to be replicated in a second instance of the storage system at the second storage site based on the registry replicant.

DETAILED DESCRIPTION

Some aspects and features of this disclosure provide a system that can use computer algorithms to provide network participants a high-availability storage platform employing computing devices and databases across multiple redundant sites. Data can be replicated to multiple storage sites with high speed and efficiency when a request to store or update content is received. Thus, reliable redundancy can be provided with less delay than would otherwise be imposed by waiting for designated duplication events to complete. In some examples, the architecture is used to store digital remittance documents on behalf of network participants such as banks or other users.

A reference registry can provide a link between various participants that need to access the same items, for example, an originating institution and a receiving or depositary institution. Only authorized users of the system can retrieve the remittance document to service customers. To ensure that any data received is not lost, the system can replicate registry information stored at the receiving site to at least one additional site within the infrastructure. Replication can begin substantially immediately upon receiving content via an application program interface (API) call, by including replication logic in the API, and through the use of a replicant. A replicant, also referred to as a registry replicant, is a small and efficient file that can be sent immediately to additional storage system sites to enable a site to quickly build appropriate registry entries to store and index the content to make it accessible to the system quickly. A replicant can include all the information needed to create registry entries, parts of which may otherwise reside in different tables or locations. The replicant is formatted to that information can be accessed in an object-oriented manner.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
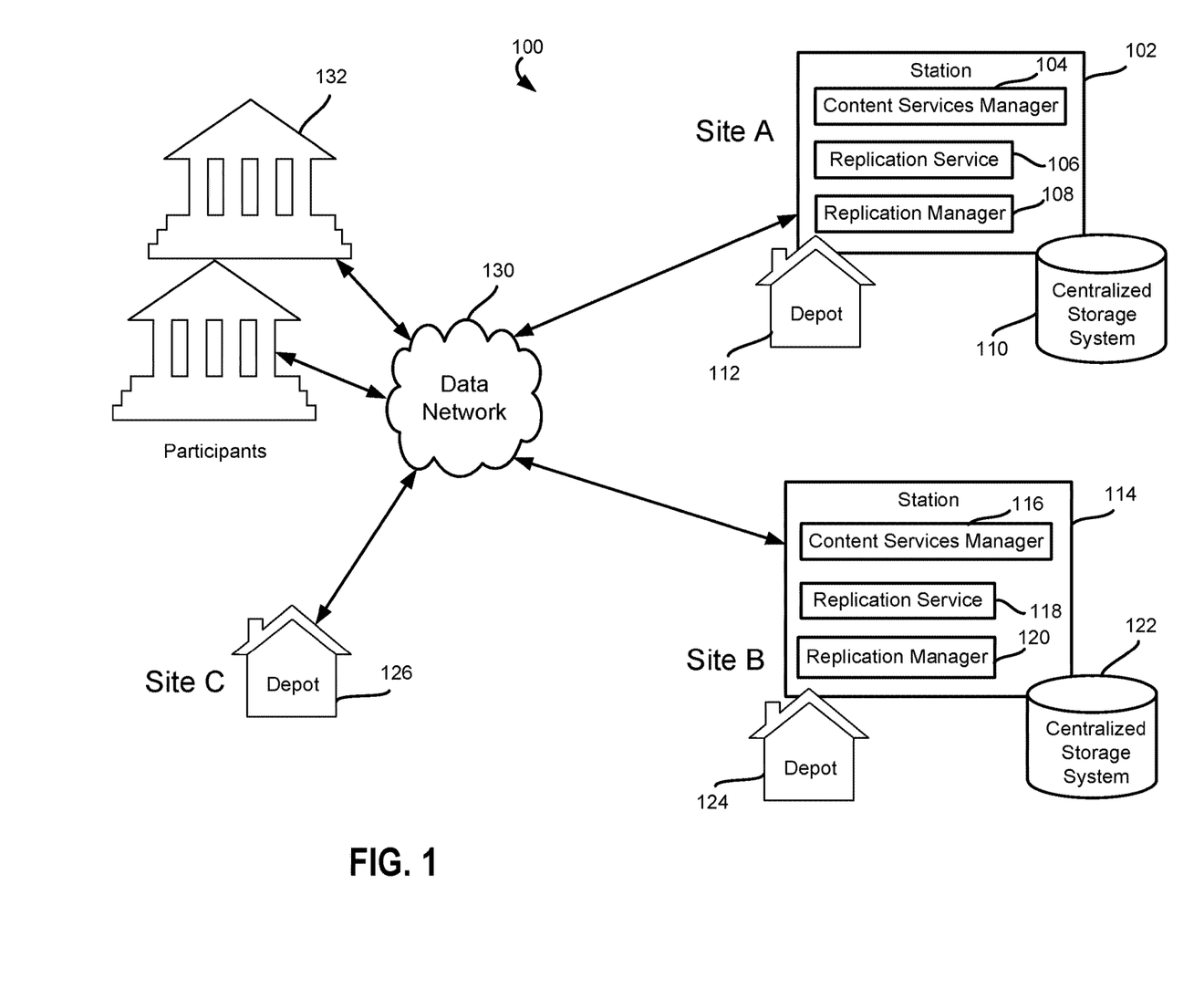
FIG. 1 is a block diagram of a system for providing content services replication according to at least some aspects of the present disclosure.

Referring now to the drawings, FIG. 1 shows an example of a system 100 for providing request-based content services replication according to some aspects. FIG. 1 shows examples of hardware components of a system 100. The system is designed to provide API-based content services for storing and retrieving information. The system 100 includes three storage sites, site A, site B, and site C. Each of site A and site B includes a station and thus includes an instance of a centralized storage system. For convenience in the discussion herein, where a storage site such as site A is the first site to receive a request or information, the site can be referred to as a first storage site that includes a first instance of a centralized storage system and any other common components. Another storage site such as site B can be referred to as a second storage site with a second instance of the centralized storage system and any other common components. A storage site on the network that first receives a request or message can also be referred to as the originating site.

A station is a collection of computing resources that includes one or more computing devices to execute computer program code to perform various tasks connected with operating the broader system, including performing replication tasks. For example, site A includes station 102, which executes, as examples, a content services manger 104, a replication service 106, and a replication manager 108. Station 102 includes or is locally connected to a first instance 110 of the centralized storage system and a data depot 112.

Site B in FIG. 1 includes station 114, which executes, as examples, content services manger 116, replication service 118, and replication manager 120. Station 114 includes or is locally connected to second instance 122 of the centralized storage system and data depot 124. In the examples described herein, a site can include a station and a data depot, or only a data depot. A station includes all components available for complete implementation and use of a centralized storage system and a reference registry at the site. A station in this example also includes APIs (not shown in FIG. 1). To accommodate these functions, a station includes storage media such as that provided by high-speed disk arrays. A data depot is a storage site or location at a storage site to store data in the event APIs in the system cannot replicate to a station. The use of data depots ensures supporting data and content cannot be lost once the originating storage site has successfully responded to a request, since the data and a copy of the content can be selectively stored at either the instance of the centralized storage system at that site or at a data depot. A data depot can be provided to allow an additional site to save data and content outside of its own environment if all stations are unavailable. System 100 includes site C, which further includes data depot 126, but does not include a station.

Servers located at the sites in system 100 may include adapters, routers, etc., for accessing data network 130. The data network 130 can also be incorporated entirely within (or can include) the Internet, an intranet, an extranet, or a combination thereof. In one example, communications between two or more devices can be achieved by a secure communications protocol, such as secure sockets layer ("SSL") or transport layer security ("TLS"). The system 100 includes one or more participants 132. The term participant is intended to invoke client computing resources installed or controlled by a user of the content services provided using the computing resources at the sites shown in FIG. 1. For purposes of this discussion, any instance or copy of a data structure such as a database, table, or storage system can be referred to with any of the terms, instance, copy, or the general name of the relevant data structure (replication table, replicant, storage system, etc.).

In some aspects, the replication service that is running within a station will manage the outstanding replication queue and will communicate directly with the replication manager in another station. The replication service does not normally replicate to a data depot. This replication service can continue to retry outstanding replication requests until it has successfully replicated the outstanding request to all configured stations. Manual intervention might be required to fix or address a problem, but in normal operation, the replication service will ensure all outstanding replications are completed.

The replication service can be configured to allow for replication requests to be processed in a specific order to expedite the completion of time sensitive replication requests. Otherwise, in most aspects, all requests are ordered for processing by newest to oldest. The logic within the replication managers in some aspects can handle out of order requests. This capability allows the replication service to expedite outstanding requests by simply marking older outstanding requests as completed based on the newest replication request successfully completing. A replication table is architected to allow multiple replication service applications such as replication services 106 and 118 of FIG. 1, to process the queue at the same time without competing for the same request.

In some examples, the station replication manager receives replication requests and processes the requests. For example, a replication manager at a second storage site can store content in its instance of the storage system in response to a replication request from the replication service at a first storage site. The replication manager receives representational state transfer requests through an API (RESTful API requests) and processes a request using replication manager logic based on what is being presented in the payload of the request. Payloads can be provided as JavaScript object notation (JSON) objects. In the example of FIG. 1, a station replication manager is only active at a site with a station. A site with only a data depot, such as site C, does not have an active replication manger.

During normal operation in the example of FIG. 1, all requests would be replicated and processed in the order in which they were received, but as previously mentioned, the station replication manager can process the requests in any order. The replication manager tracks what it is receiving, and what it might be missing. The logic in the replication manager is tightly coupled with all of the potential requesting web services. If the station replication manager receives a request to add content (an AddContent message) before it received the request to create a registry entry (a CreateRegistryEntry message), the replication manager has sufficient information to create the complete registry entry even though it is missing the actual content that corresponds to the registry entry to be created. If a request for content is received (a GetContent message) at a site before the create registry request is replicated to the site, a GetContent API can make use of a go-home function that can call the originating storage site to retrieve missing content.

Figure 2:
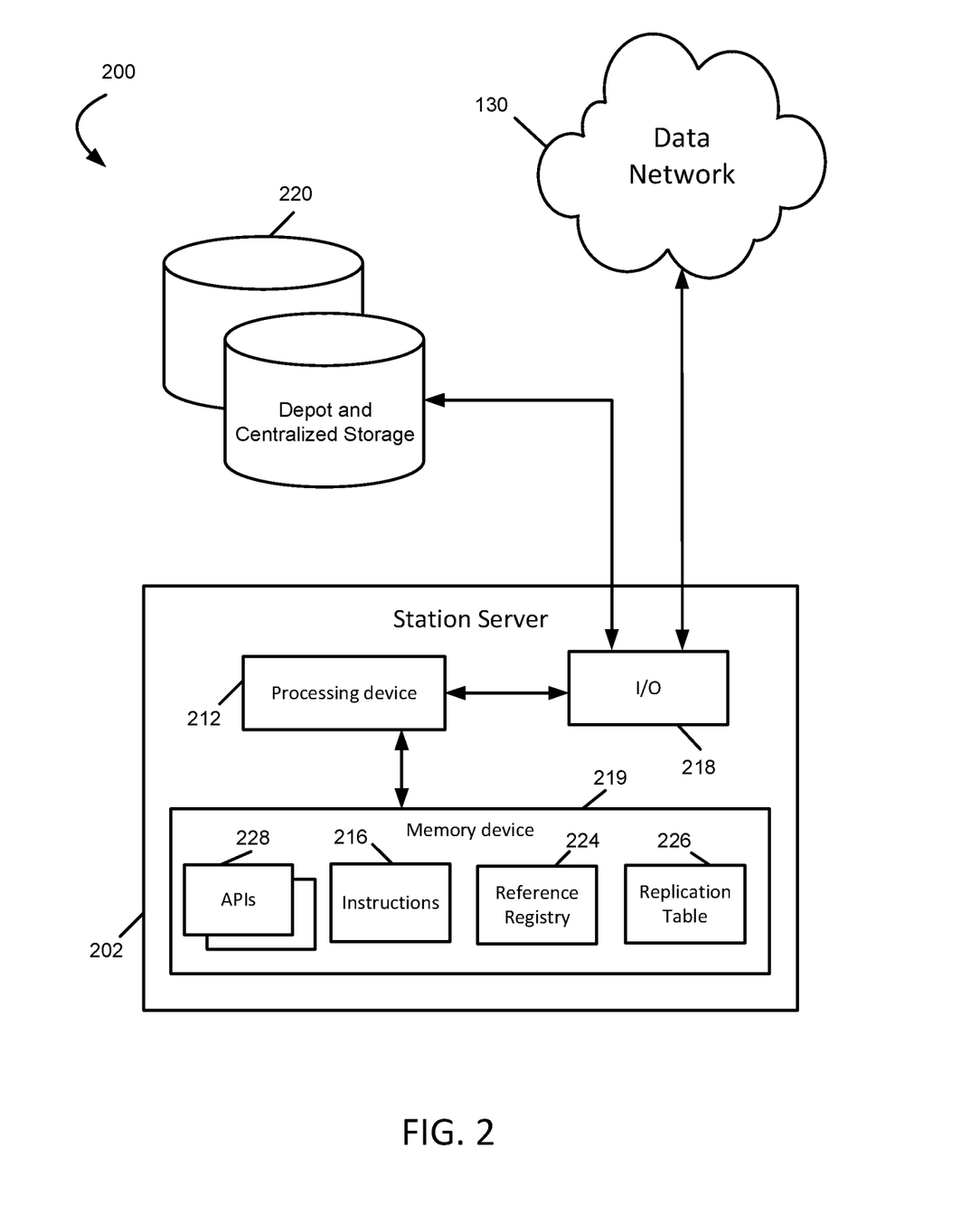
FIG. 2 is another block diagram of another system for providing content services replication according to at least some aspects of the present disclosure.

FIG. 2 is a block diagram of an example of a system 200 for implementing a storage site. System 200 includes a connection to data network 130. Data network 130 is connected to a station server 202. Server 202 includes processing device 212, which can execute computer program code, also referred to as instructions, computer program code, computer-readable instructions, or computer program instructions 216, executable by the processing device 212 for performing operations of the content services manager, replication service, and replication manager according to aspects of this disclosure. Instructions 216 can also include program code for executing any applications that interpret commands and perform replication tasks. Processing device 212 is communicatively coupled to I/O interface 218 and to the memory device 219. The processing device 212 can include one processing device or multiple processing devices. Non-limiting examples of the processing device 212 include a field-programmable gate array (FPGA), an application-specific integrated circuit (ASIC), a microprocessor, etc. The processing device 212 can execute one or more operations for request-based content services replication as directed by computer program instructions 216 stored in the memory device 219. The processing device 212 generates messages following network file system (NFS) protocols and other communication protocols discussed herein to be sent through I/O interface 218 to other station servers running on network 130. The processing device also reads and write to storage 220, which is typically a fixed disk array in which an instance of the centralized storage system resides. A data depot can also reside in storage 220.

Memory device 219 in system 200 can include one memory device or multiple memory devices. The memory device 219 can be non-volatile and may include any type of memory device that retains stored information when powered off. In some examples, at least some of the memory device can include a non-transitory computer-readable medium from which the processing device 212 can read instructions 216. A computer-readable medium can include electronic, optical, magnetic, or other storage devices capable of providing the processing device with computer-readable instructions 216 or other program code. Non-limiting examples of the memory device 219 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

In FIG. 2, memory device 219 also includes an instance 224 of the reference registry and a copy 226 of the replication table, as well as APIs 228. The replication table 226 is configured to contain information about registry entry replications. This database will have an entry inserted when one of the web services that is supported by one of the APIs 228 receives a request and is able to replicate to one of the remote stations or data depots. Although FIG. 2 shows a certain arrangement of components for illustrative purposes, other examples can include any number and combination of these components arranged in any suitable configuration.

Figure 3:
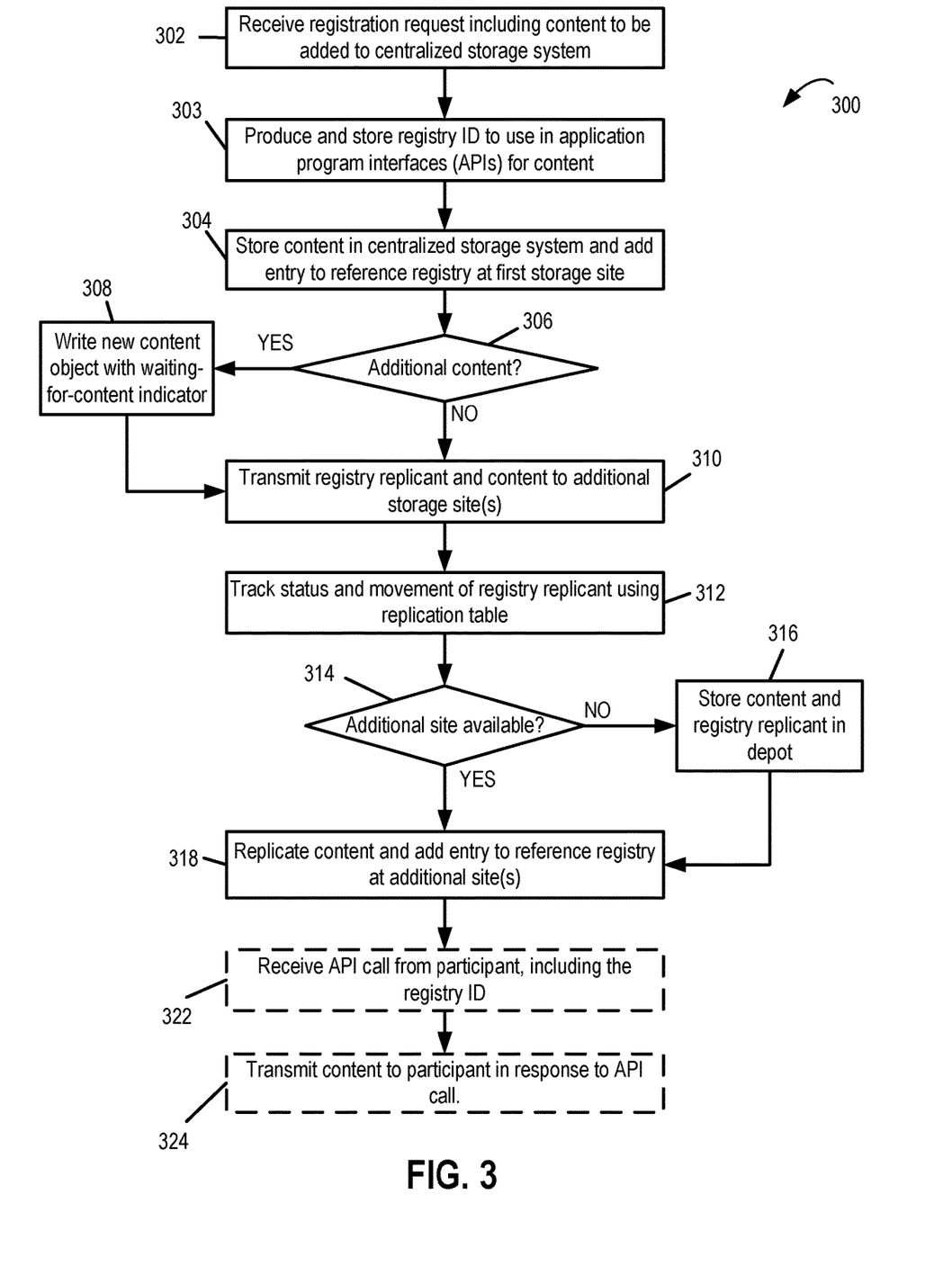
FIG. 3 is a flowchart of a process for content services replication according to at least some aspects of the present disclosure.

In some examples, a computing device such as station server 202 can perform one or more of the operations shown in FIG. 3 to provide content services replication according to some aspects of the disclosure. In other examples, the processing device 212 of the server can implement more operations, fewer operations, different operations, or a different order of the operations depicted in FIG. 3. Process 300 of FIG. 3 is described below with reference to components discussed above.

At block 302 in FIG. 3, server 202 receives a registration request over data network 130 from a participant. The request includes content to be stored and registered by creating a registry entry. The storage site where server 202 resides is one of multiple storage sites. The request can include both metadata and content to be added to the centralized storage system. At block 303, a registry identifier (ID) for the new reference registry entry is created. This registry ID can be used in subsequent application program interface calls for the content. At block 304, processing device 212 stores the content in an instance of the centralized storage system at the storage site and adds a corresponding descriptive entry to instance 224 of the reference registry, including an indication that the content is registered in the centralized storage system. If processing device 212 determines at block 306 that the metadata indicates additional content is following, the processing device writes a new content object to the reference registry at block 308 based on the presence of the indication in the metadata. The new content object can include a waiting-for-content status indicator. The new content object can be propagated to other sites. A content services request is inserted into the reference registry for every required service to be applied against the new content. The content services requests are used by content services managers.

At block 310 in FIG. 3, processing device 212 transmits the registry replicant and the content to one or more additional storage sites. At block 312, processing device 212 uses replication table 226 to track the status and movement of the registry replicant. At block 314, processing device 212 determines if a station at the additional site is available. If not, a copy of the content may be stored in a data depot at block 316. If a data depot associated with the inaccessible station is not available, the content and the registry replicant can be written to another data depot. The content and corresponding information from a data depot can be copied to the storage system instances when the storage system instances are available. If the station at the additional site is available, at block 318, the station replication managers use the registry replicant to replicate the new content at the additional storage site or sites and cause the reference registry instances to be updated. At block 322, station server 202 receives an API call (a GetContent request) from a participant system seeking to retrieve content over data network 130, and that API call includes the registry ID. At block 324, processing device 212 transmits the content to the participant in response to the API call.

In some examples, APIs 228 include a web service API. As a further example, the web service API that is servicing the GetContent request above can communicate with the station replication manager or directly to storage 220. The web service will only replicate to one destination (except for a request to prevent access as discussed below), a station or a data depot, in order to provide speed and processing efficiency. Restricting the web service to one destination ensures that the data cannot be lost but that the web service API can respond quickly to a request. The replication service ensures that the request is replicated to all outstanding stations.

As an example of the request to prevent access, a PreventAccess request requires immediate replication of the request to all stations to prevent a GetContent request from returning stale or otherwise incorrect content. The replication logic the PreventAccess request will replicate to all active stations. If no active stations are available, the request is rejected. As long as the web service replicates the request to a station or data depot, an entry will be inserted into the replications table 226 to show the status of the initial replication. If the replication was completed to a data depot, the replication service can ultimately ensure the request is completed to all configured stations. Native disk storage can be used to accept replication requests as a transient means to maintain the data somewhere other than the station at the storage site that received the request. The request can fulfilled by saving the registry replicant to a folder structure. In some examples, a web service that is servicing a request will have access to one or more data depots, which appear as a folder to the web service and any other applications.

Figure 4:
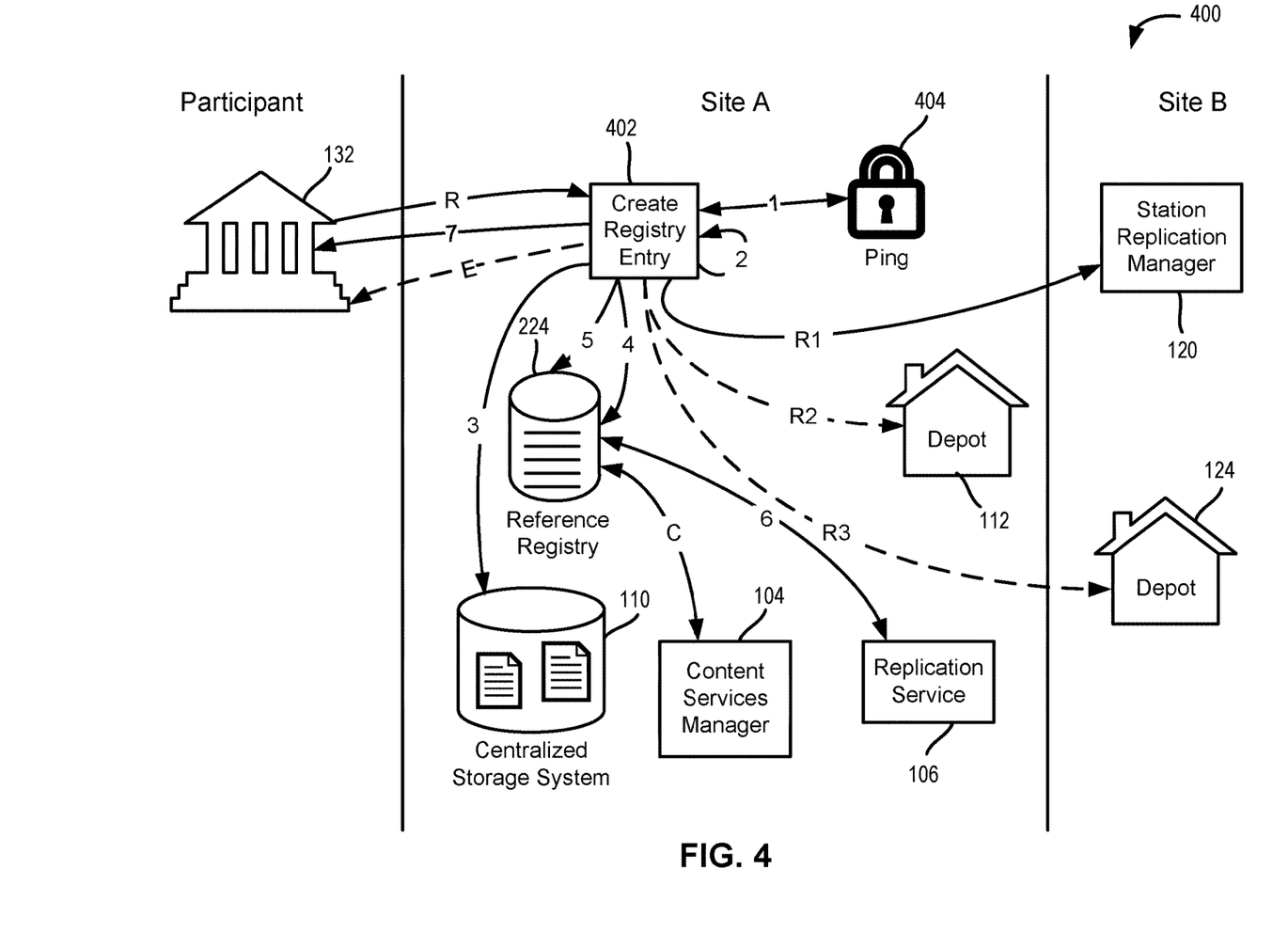
FIG. 4 is a software entity diagram illustrating messaging for content services replication according to at least some aspects of the present disclosure.

FIG. 4 is a software entity diagram illustrating messaging for content services replication according to at least some aspects of the present disclosure. Messaging flow 400 is illustrated using the components of FIG. 1 and FIG. 2. The messaging flow execution in this example follows the receipt of a request to create a registry entry for new content (CreateRegistryEntry request). The CreateRegistryEntry request R from participant 132 is received at create-registry application 402 through its API at storage site A. Application 402 authenticates the request using an access-control mechanism, which may be part of a single-sign-on (SSO) system. In this example, messaging 1 is exchanged with a PingFederate® server 404 to securely authenticate the request. Application 402 can validate participants with a web token payload that is provided with every web service call made by a participant. Application 402 can validate the structure and access internally via messaging 2. Application 402 can then write the content from the request to storage system 110 via message 3, and insert a new registry entry in reference registry 224 with message 4. The registry entry can indicate a registered status for all content, or otherwise indicate a waiting-for-content status as previously discussed. If all content associated with the request R has been provided but is not yet registered, the content object in the reference registry can indicate a processing status.

Still referring to FIG. 4, messaging C inserts content service requests into reference registry 224 for every service to be applied against the content, and these requests are used by content services manager 104 asynchronously, while the rest of the messaging shown in FIG. 4 continues. Application 402 sends the content and a corresponding replicant via message R1 to station replication manager 120. Station replication manager 120 can use the replicant to quickly build a registry entry for its instance of the reference registry and to write the content to the centralized storage system at storage site B. If the centralized storage system instance at storage site B is not accessible, application 402 sends the content and replicant via message R2 to data depot 112 at site A. If the centralized storage system instance at site B is not accessible and the data depot on site A is not accessible, application 402 sends the content and replicant via message R3 to data depot 124 at storage site B.

Application 402 can build a replication audit record for all other sites and inserts the record in reference registry 224 via message 5. Replication service 106 uses the audit record to propagate the content and replicant to remaining available station replication managers via messaging 6 exchanged with replication service 106. If the above actions are successful, application 402 can create and store the registry ID, and return the registry ID to participant 132 via message 7. Otherwise, an error message E can be returned to participant 132.

In some examples, the registry ID is unique in that it contains information about where and when a registry entry was originally created. In some examples, the registry id is a base-64 encoded string that contains three parts—a site name corresponding to where the registry entry was created, a globally unique identifier (GUID) for the registry entry, and the date and time the registry entry was created. If a request is received at a storage site where the registry entry does not exist or a component of the registry entry has not been replicated, the receiving API can use the go-home function, with which the information in the registry id to make the same API call to the originating site to fulfill the request. The registry id can be decoded to access the three parts described above and the API can compare the date and time at which the registry entry was created against the current date and time. If the difference is less than a configurable value (typically hours), the API will make the same API request to the site that created the registry ID (the home site). If the date and time is outside the configurable value, the request is rejected and an error message is generated. The configurable value allows for any delays in replicating between sites.

In some examples, since there is additional overhead in making a second call to fulfill a request, the configurable date and time are used only to query the originating site in case of delayed replication requests. After the allowed date and time (after registration) has passed, the request can be serviced locally and if the registry entry or any components are missing, an error message can be generated. Registry entries will typically only live for a finite period of time (a retention period) and the date and time value ensure that the go-home logic is not adding additional overhead by calling the home site when the registry entry has been deleted.

Figure 5A:
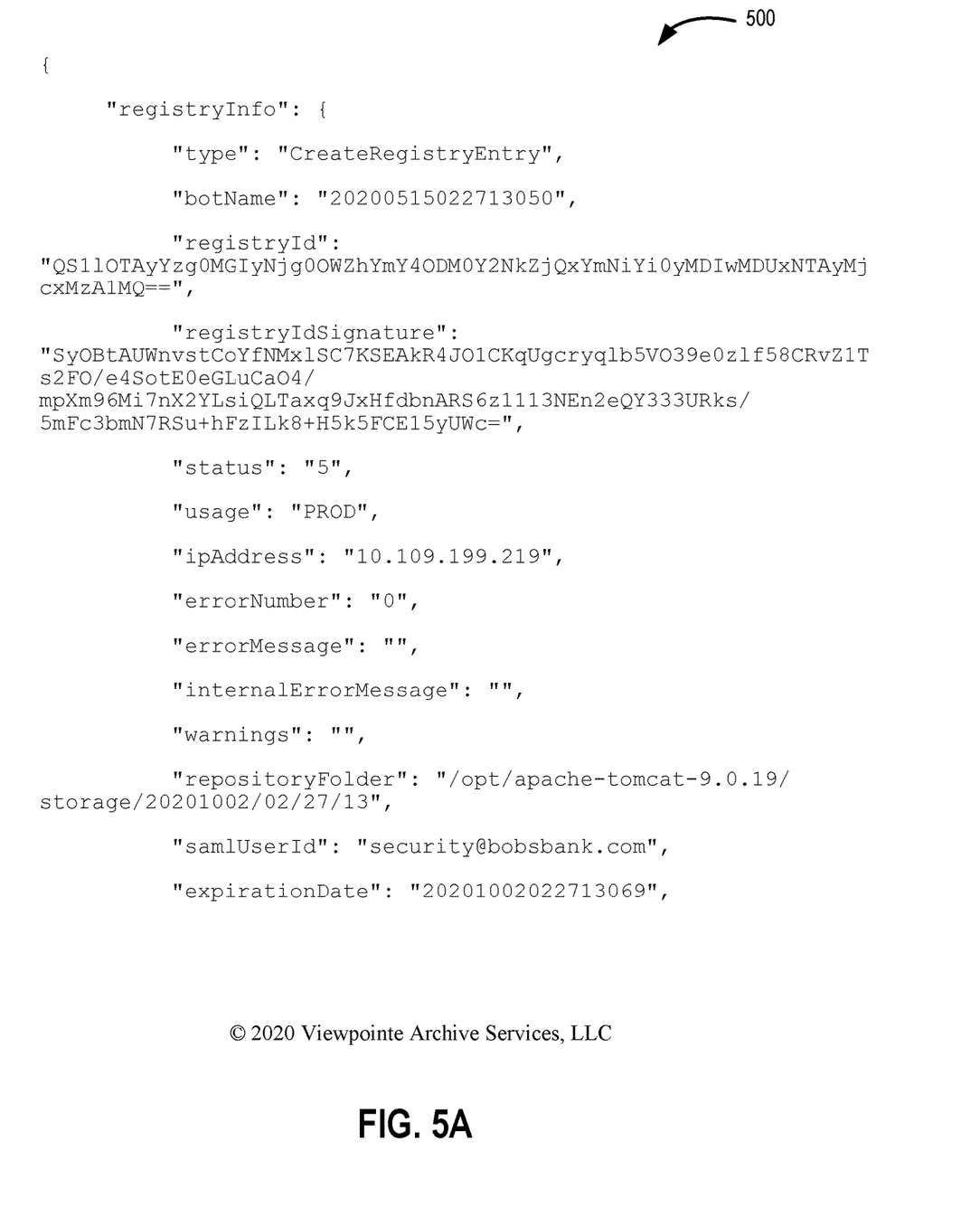
FIGS. 5A, 5B, and 5C illustrate an example of a data structure that can be used in content services replication according to at least some aspects of the present disclosure.
Figure 5B:
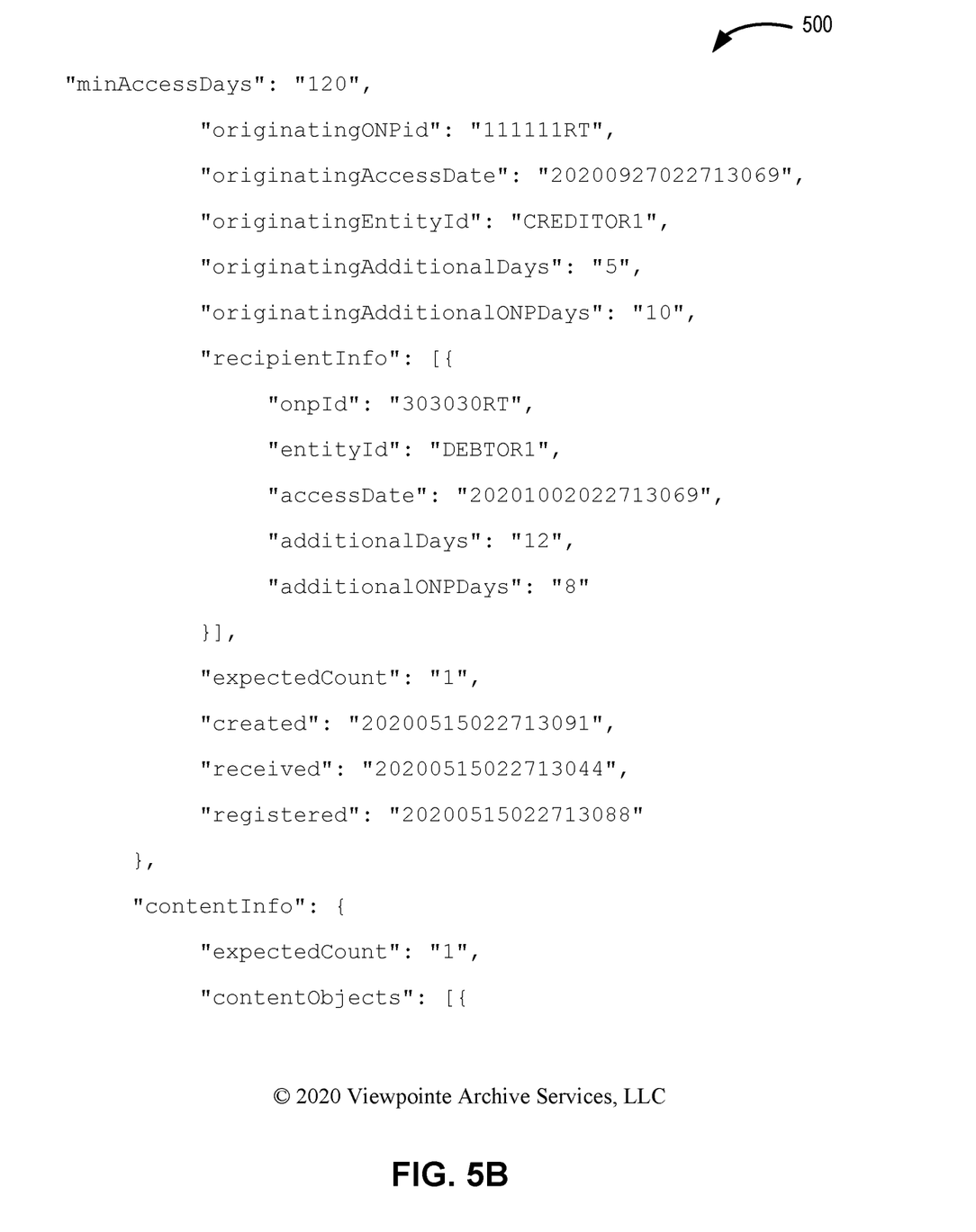
Figure 5C:
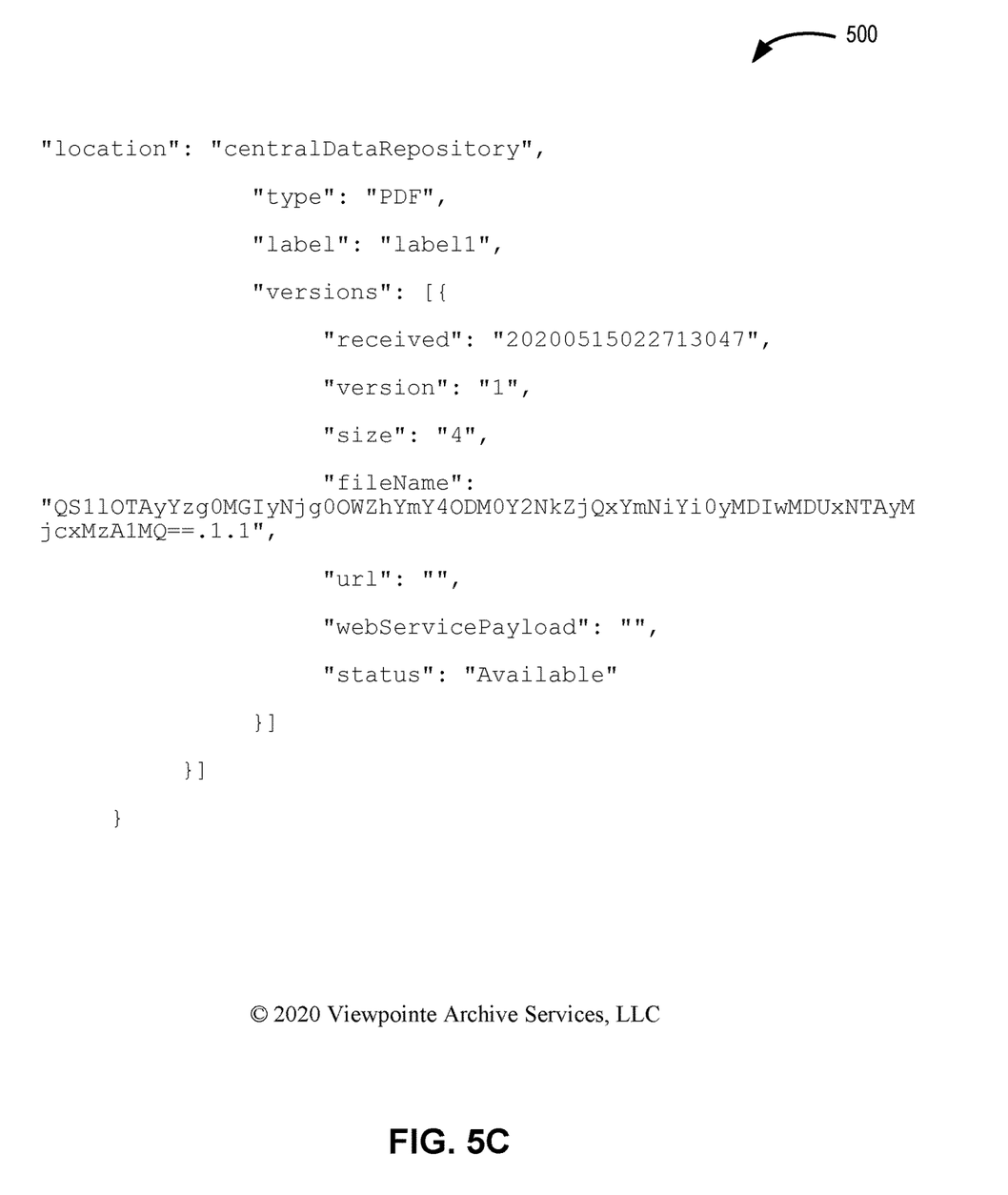

FIGS. 5A, 5B, and 5C illustrate an example of a data structure for the replicant that can be used in content services replication according to at least some aspects of the present disclosure. The first portion of data structure 500 is shown in FIG. 5A, the second portion of data structure 500 is shown in FIG. 5B, and the third portion of data structure 500 is shown in FIG. 5C. The replicant in this example is a string of text representing a JSON object. The contents of this file can be used to build an appropriate message structure when making a replication request. The contents are also useful for rebuilding a registry entry if the entry were to become corrupted or inadvertently deleted. The replicant in this example includes a registry identifier, a digital signature, at least one participant identifier, metadata, a date, and a time stamp. The replicant acts as a data access object by abstracting and encapsulating relevant portions of the reference registry so that those portions can be randomly accessed from the replicant in an object-oriented manner.

The data structure of FIG. 5 can be used to build messages exchanged by the APIs of the system. Such messages include the CreateRegistryEntry message and the AddContent message discussed previously. In addition to the details shown in FIG. 5, these messages can include the content and a corresponding file name. As examples, an UpdateContent message can include a file type, label, the content, a uniform resource locator, and a web service payload. An UpdateExpiration message can include values for additional days, and identifier for the originator of the message and other identifiers. An UpdateMetaData message can include metadata. The previously mentioned PreventAccess message can include a replication information object that identifies the entity to restrict and the recipients of the message.

In some examples, the system leverages database tables for all data outside of the actual content to be stored in the centralized storage system. One of those tables, the replication table as shown in FIG. 2, can be configured to contain information about registry entry replications. This table can have an entry inserted when one of the web services receives a request and is able to replicate to one of the remote stations or a data depot. If the web service cannot replicate to a station or data depot, the request can be canceled or rejected. The table can provide a source of information for the replication service so that the replication service can monitor and manage all outstanding replications. If the receiving web service is able to replicate to a station, and that station corresponds to the only other site in the defined infrastructure, the replication entry can be treated as complete. If the receiving web service was only able to replicate to a data depot, or there are additional storage sites defined, the replication service will attempt to replicate the request to all site stations that have not received the information.

In some examples, the replication table's structure includes a request type specifying a message from among the various messages discussed above. In some examples, the table includes the registry ID, also discussed above. In some examples, the table includes an originating site name. In some examples, the table includes dates and times replications have succeed to the various available stations and data depots. Folder locations used for replications can be included in the replication table or can be stored in another stored table maintained specifically for this purpose.

The replication table structure can also include an identifier for a folder within a local disk system where the replicant and registry entry components can be stored. The table can also include a file name for the replicant as well as dates and times for the creation of a replication request, the completion of a replication requests, and for deletions of registry entries, table entries, and components stored on disk. The replication table can also include a field that identifies the entity that owns the table and a field that identifies any errors that occurred during the most recent replication.

Unless specifically stated otherwise, throughout this specification terms such as "processing" and "computing," refer to actions or processes of a computing or processing device, such as one or more computers or a similar electronic computing device or devices that manipulate or transform data represented as physical electronic or magnetic quantities within memories, registers, or other information storage devices, transmission devices, or display devices of the computing platform. The order of at some of the blocks presented in the examples above can be varied—for example, blocks can be re-ordered, combined, or broken into sub-blocks. Certain blocks or processes can be performed in parallel. The use of "based on" is meant to refer to actions or processes of a computing or processing device, and to be open and inclusive, in that a process or other action "based on" one or more recited conditions or values may, in practice, be based on additional conditions or values beyond those recited.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

What is claimed is:

1. A system comprising:
   a processing device; and
   at least one memory device including instructions that are executable by the processing device for causing the processing device to perform operations comprising:
   receiving, at a first storage site from among a plurality of storage sites, a registration request including content to be registered in a centralized storage system;
   storing the content in a first instance of the centralized storage system at the first storage site;
   storing a descriptive entry in a first instance of a reference registry at the first storage site, the descriptive entry corresponding to the content;
   producing a registry identifier (ID) comprising a site name corresponding to creation of the descriptive entry at the first storage site;
   creating a registry replicant including the registry ID and abstracted portions of the reference registry configured to be randomly accessed;
   transmitting the registry replicant including the registry ID to a second storage site from among the plurality of storage sites based on the descriptive entry;
   tracking status and movement of the registry replicant using a replication table architected to allow multiple replication services across the plurality of storage sites to process a replication queue; and
   causing the content to be replicated in a second instance of the centralized storage system at the second storage site by accessing the registry replicant, wherein each instance of the centralized storage system includes an application program interface (API) configured for access to the centralized storage system by a participant.

2. The system of claim 1, wherein the operations further comprise storing the content in a data depot prior to causing the content to be replicated in the second instance of the centralized storage system based on an availability of the second instance of the centralized storage system.

3. The system of claim 2, wherein the operations further comprise:
   storing, by a replication manager at the second storage site, the content in the second instance of the centralized storage system in response to a replication request from a replication service at the first storage site;
   accessing the registry replicant at the second storage site; and
   updating the second instance of the reference registry based on the registry replicant.

4. The system of claim 3, wherein the registry replicant further comprises:
   a digital signature;
   at least one participant identifier;
   metadata; and
   at least one of a date or a time stamp.

5. The system of claim 1, wherein the operations further comprise writing a new content object including a waiting-for-content indicator to the reference registry based on a presence in metadata of an indication of additional content.

6. The system of claim 1, wherein the operations further comprise:
- storing the registry ID associated with the content to identify the content in the API;
- receiving an API call including the registry identifier from the participant; and
- transmitting the content to the participant in response to receiving the API call, wherein the content is selectively transmitted from the first storage site using the site name or from the second storage site, based on availability of the content and subject to a maximum replication delay.

7. A method comprising:
- receiving, by a processing device at a first storage site from among a plurality of storage sites, a registration request including content to be registered in a centralized storage system;
- storing, by the processing device, the content in a first instance of the centralized storage system at the first storage site;
- storing, by the processing device, a descriptive entry in a first instance of a reference registry at the first storage site, the descriptive entry corresponding to the content;
- producing, by the processing device, a registry identifier (ID) comprising a site name corresponding to creation of the descriptive entry at the first storage site;
- creating a registry replicant including the registry ID and abstracted portions of the reference registry configured to be randomly accessed;
- transmitting, by the processing device, the registry replicant including the registry ID to a second storage site from among the plurality of storage sites based on the descriptive entry;
- tracking, by the processing device, status and movement of the registry replicant using a replication table architected to allow multiple replication services across the plurality of storage sites to process a replication queue; and
- causing, by the processing device, the content to be replicated in a second instance of the centralized storage system at the second storage site by accessing the registry replicant, wherein each instance of the centralized storage system includes an application program interface (API) configured for access to the centralized storage system by a participant.

8. The method of claim 7, further comprising storing the content in a data depot prior to causing the content to be replicated in the second instance of the centralized storage system based on an availability of the second instance of the centralized storage system.

9. The method of claim 7, further comprising:
- storing, by a replication manager at the second storage site, the content in the second instance of the centralized storage system in response to a replication request from a replication service at the first storage site;
- accessing the registry replicant at the second storage site; and
- updating the second instance of the reference registry based on the registry replicant.

10. The method of claim 7, further comprising writing a new content object including a waiting-for-content indicator to the reference registry based on a presence in metadata of an indication additional content.

11. The method of claim 7, further comprising:
- storing the registry ID associated with the content to identify the content in the API;
- receiving an API call including the registry identifier from the participant; and
- transmitting the content to the participant in response to receiving the API call, wherein the content is selectively transmitted from the first storage site using the site name or from the second storage site, based on availability of the content and subject to a maximum replication delay.

12. A non-transitory computer-readable medium including computer program instructions executable by a processing device to cause the processing device to perform operations, the operations comprising:
- receiving, at a first storage site from among a plurality of storage sites, a registration request including content to be registered in a centralized storage system;
- storing the content in a first instance of the centralized storage system at the first storage site;
- storing a descriptive entry in a first instance of a reference registry at the first storage site, the descriptive entry corresponding to the content;
- producing a registry identifier (ID) comprising a site name corresponding to creation of the descriptive entry at the first storage site;
- creating a registry replicant including the registry ID and abstracted portions of the reference registry configured to be randomly accessed;
- transmitting the registry replicant including the registry ID to a second storage site from among the plurality of storage sites based on the descriptive entry;
- tracking status and movement of the registry replicant using a replication table architected to allow multiple replication services across the plurality of storage sites to process a replication queue; and
- causing the content to be replicated in a second instance of the centralized storage system at the second storage site by accessing the registry replicant, wherein each instance of the centralized storage system includes an application program interface (API) configured for access to the centralized storage system by a participant.

13. The non-transitory computer-readable medium of claim 12, wherein the operations further comprise storing the content in a data depot prior to causing the content to be replicated in the second instance of the centralized storage system based on an availability of the second instance of the centralized storage system.

14. The non-transitory computer-readable medium of claim 13, wherein the operations further comprise:
- storing, by a replication manager at the second storage site, the content in the second instance of the centralized storage system in response to a replication request from a replication service at the first storage site;
- accessing the registry replicant at the second storage site; and
- updating the second instance of the reference registry based on the registry replicant.

15. The non-transitory computer-readable medium of claim 14, wherein the registry replicant further comprises:
- a digital signature;
- at least one participant identifier;
- metadata; and
- at least one of a date or a time stamp.

16. The non-transitory computer-readable medium of claim 12, wherein the operations further comprise writing a new content object including a waiting-for-content indicator to the reference registry based on a presence in metadata of an indication of additional content.

17. The non-transitory computer-readable medium of claim 12, wherein the operations further comprise:
- storing the registry ID associated with the content to identify the content in the API;
- receiving an API call including the registry identifier from the participant; and
- transmitting the content to the participant in response to receiving the API call, wherein the content is selectively transmitted from the first storage site using the site name or from the second storage site, based on availability of the content and subject to a maximum replication delay.

* * * * *